(12) United States Patent
Lu (10) Patent No.: US 9,345,054 B1
(45) Date of Patent: May 17, 2016

(54) HOME CONTROL GATEWAY AND GATEWAY CONTROL METHOD THEREOF

(71) Applicant: proeasy network solutions co., LTD., Hsinchu County (TW)

(72) Inventor: Hsing-Hung Lu, Hsinchu County (TW)

(73) Assignee: proeasy network solutions co., LTD., Hsinchu County (TW)

( * ) Notice: Subject to any disclaimer, the term of this patent is extended or adjusted under 35 U.S.C. 154(b) by 0 days.

(21) Appl. No.: 14/723,479

(22) Filed: May 28, 2015

(30) Foreign Application Priority Data

Apr. 8, 2015 (TW) .............................. 104111232 A (51) Int. Cl.
*H04W 76/02* (2009.01)
*H04M 1/725* (2006.01)

(52) U.S. Cl.
CPC ........ *H04W 76/021* (2013.01); *H04M 1/72533* (2013.01)

(58) Field of Classification Search
CPC ....... H04W 8/183; H04W 8/26; H04W 88/02; H04W 76/02; H04W 88/06; H04W 76/021; H04M 1/72533
See application file for complete search history.

(56) References Cited

U.S. PATENT DOCUMENTS

| 8,041,335 | B2 * | 10/2011 | Khetawat | ............. | H04L 63/104 455/404.1 |
| 8,639,214 | B1 * | 1/2014 | Fujisaki | ................ | G06Q 20/32 379/88.03 |
| 8,682,361 | B2 | 3/2014 | Park et al. | | |
| 2006/0063517 | A1 * | 3/2006 | Oh | .................... | H04M 3/42348 455/415 |
| 2008/0209034 | A1 * | 8/2008 | Shin | .................... | H04L 12/2807 709/224 |
| 2008/0267171 | A1 * | 10/2008 | Buckley | ............ | H04L 29/06027 370/352 |
| 2012/0172067 | A1 | 7/2012 | Gillin | | |

FOREIGN PATENT DOCUMENTS

| CN | 203050354 | 7/2013 |
| CN | 103442341 | 12/2013 |
| CN | 103529757 | 1/2014 |
| TW | 201304575 | 1/2013 |

* cited by examiner

*Primary Examiner* — Ted Wang
(74) *Attorney, Agent, or Firm* — Jianq Chyun IP Office (57) ABSTRACT

A home control gateway and a gateway control method are provided. The home control gateway includes a gateway management module, a first communication circuit, and a second communication circuit. The gateway management module records registers. The gateway management module sets a value of a first register as a first value when an incoming called-number corresponding to the incoming called-signal received by the first communication circuit via a mobile phone network is one of the pre-stored phone numbers. The gateway management module sets the value of the second register as the first value in response to a connection request received by the second communication circuit via a local network. And, the gateway management module activates a home control function corresponding to the second register when the values of the first register and the second register are both the first value.

16 Claims, 6 Drawing Sheets

HOME CONTROL GATEWAY AND GATEWAY CONTROL METHOD THEREOF

CROSS-REFERENCE TO RELATED APPLICATION

This application claims the priority benefit of Taiwan application serial no. 104111232, filed on Apr. 8, 2015. The entirety of the above-mentioned patent application is hereby incorporated by reference herein and made a part of this specification.

BACKGROUND OF THE INVENTION

1. Field of the Invention

The invention relates a home control technology, and more particularly, relates to a home control gateway and a gateway control method thereof.

2. Description of Related Art

A home automation control system generally uses of the automated equipments in combination with computer software technology and applications to integrate household equipments (e.g., televisions, electric rice cooker, air conditioners, refrigerators, gas switches, alarm systems, security systems, surveillance systems, etc.), so as to improve home comfort and home safety. The home automation control system usually includes a control system and a control host, such that users may issue control commands via the control system in order to drive various equipments through the control system. In addition, various wireless communication transmission technologies (e.g., GPRS, WiFi, WiMAX, 3G or 4G) can achieve greater flexibility and convenience by using the function of Internet connectivity in mobile equipments (e.g., mobile phones or notebook computers) to connect the Internet in order to remotely control various household equipments, enable a security mechanism, or monitor home events even if the users are in business trip, on vacation or traveling.

However, the remote control provides not only the flexibility and convenience but also security issues such as confirmation on user identity. In general, the control host assigns a control right to a user and thereby allows the user to achieve the purpose of the remote control only after the user identity is confirmed through an authentication mechanism. A common method to the above is to provide a web address by a remote home control system host, so that the user may enter a user name and a password correctly through the web address in order to obtain the control right of the remote home control system host after the authentication is passed. However, it is quite often that the user may forget the user name and the password, or the user name and the password may possibly be stolen. Therefore, it is one of the major subjects in the industry as how to provide a convenient, secure, simple and easy method for the user to conveniently and securely perform the remote control.

SUMMARY OF THE INVENTION

The invention is directed to a home control gateway and a gateway control method thereof, which are capable allowing the user to pre-store a plurality of phone numbers through the home control gateway. When a home control is to be performed by using the home control gateway, a phone call must be made to the home control gateway with the stored phone number in order to control home equipments by using buttons in an operating interface provided by the home control gateway, so that the home control may be performed safely and simply.

According to an exemplary embodiment of the present invention, a home control gateway including a gateway management module, a storage module, a first communication circuit, and a second communication circuit is provided. The gateway management module is coupled to the microprocessor unit, and the gateway management module records a first register and a second register and provides an operating interface configured to control the second register. The storage module is coupled to the microprocessor unit and pre-stores one or more mobile communication device numbers. The first communication circuit is coupled to the microprocessor unit, and configured to connect to a mobile phone network. The second communication circuit is coupled to the microprocessor unit, and configured to connect to a local area network. The first communication circuit receives an incoming called-signal via the mobile phone network, and the incoming called-signal includes an incoming called-number. The gateway management module sets the values of the first register as a first value when determining that the incoming called-number is identical to one of the mobile communication device numbers. The second communication circuit receives a connection request via the local area network, and the connection request is configured to access the operating interface and instruct to set the value of the second register as the first value. The gateway management module sets the value of the second register as the first value in response to the connection request. The gateway management module activates a home control function corresponding to the second register when the value of the first register and the value of the second register are both the first value.

In an exemplary embodiment of the invention, the home control gateway further includes a timer. The timer is coupled to the microprocessor unit. The gateway management module activates the timer when determining that the value of the first register is set as the first value. When the timing value of the timer is greater than the predetermined timing threshold, the gateway management module closes the timer and re-sets the value of the first register as a second value.

In an exemplary embodiment of the invention, the gateway management module initially sets the second register to be at a read-only status. The gateway management module re-sets the second register to be at a rewritable status when determining that the incoming called-number is identical to one of the mobile communication device numbers.

In an exemplary embodiment of the invention, the home control gateway pre-stores the mobile communication device numbers by a manual input method.

In an exemplary embodiment of the invention, the home control gateway pre-stores the mobile communication device numbers by a machine learning method.

In an exemplary embodiment of the invention, an amount of the mobile communication device numbers is less than a predefined value.

In an exemplary embodiment of the invention, the operating interface is accessed by a web browser or a mobile application.

In an exemplary embodiment of the invention, the local area network is a wired local area network or a wireless local area network.

According to an exemplary embodiment of the present invention, a gateway control method executed by a home control gateway providing an operating interface is provided. The gateway control method includes pre-storing one or more mobile communication device numbers; receiving an incoming called-signal including an incoming called-number via a mobile phone network; setting a value of a first register as a first value when the incoming called-number is identical to one of the mobile communication device numbers. The gateway control method also includes receiving a connection request via a local area network, wherein the connection request is configured to access the operating interface and instruct to set a value of a second register as the first value. The gateway control method still includes setting the value of the second register as the first value in response to the connection request. The gateway control method further includes activating a home control function corresponding to the second register when the value of the first register and the value of the second register are both the first value.

In an exemplary embodiment of the invention, the gateway control method further includes: activating a timer when determining that the value of the first register is set as the first value, and closing the timer and re-setting the value of the first register as a second value when a timing value of the timer is greater than a predetermined timing threshold.

In an exemplary embodiment of the invention, the gateway control method further includes: initially setting the second register to be at a read-only status, and re-setting the second register to be at a rewritable status when determining that the incoming called-number is identical to one of the mobile communication device numbers.

In an exemplary embodiment of the invention, the step of pre-storing the one or more mobile communication device numbers includes pre-storing the mobile communication device numbers by a manual input method.

In an exemplary embodiment of the invention, the step of pre-storing the one or more mobile communication device numbers includes pre-storing the mobile communication device numbers by a machine learning method.

In an exemplary embodiment of the invention, an amount of the mobile communication device numbers is less than a predefined value.

Based on the above, in the home control gateway and the gateway control method according to the embodiments of the invention, the user is able to make the phone call to the home control gateway with the pre-stored phone number to request the home control gateway for accessing the operating interface and set the registers corresponding to the home control functions through the operating interface. After determining that a value of a corresponding register is set as a corresponding value, the home control gateway may conduct the actions corresponding to the home control function selected by the user.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

With growth of the Internet technology, if steps of confirming the user identity can be further simplified and a more secure remote control method may be provided, an automation home control system may indeed be operated more conveniently and easily. The invention is developed based on the above concept.

Figure 1:
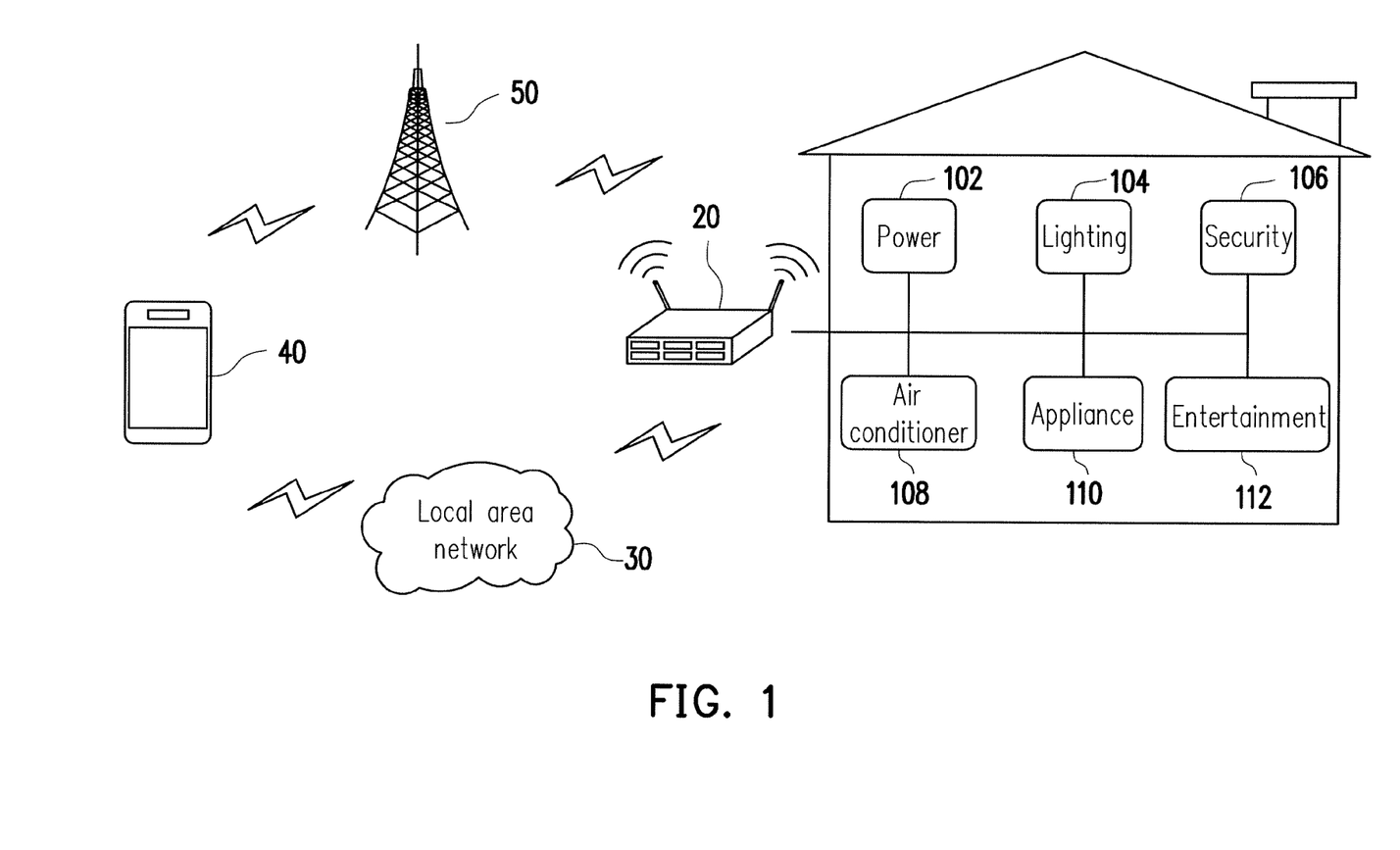
FIG. 1 is a schematic diagram illustrating a remote home control according to an exemplary embodiment.

FIG. 1 is a schematic diagram illustrating a remote home control according to an exemplary embodiment.

Referring to FIG. 1, an environment for a remote home control usually includes home equipments, a home control gateway 20, a local area network 30, a mobile communication device 40 and a mobile phone network 50.

The home equipments include a power equipment 102, a lighting equipment 104, a security equipment 106, an air condition equipment 108, an appliance equipment 110, and an entertainment equipment 112. However, it should be noted that, the home equipments are not limited to the above, and the aforesaid home equipments are not intended to limit the invention either. For example, each of the power equipment 102, the lighting equipment 104, the security equipment 106, the air condition equipment 108, the appliance equipment 110, and the entertainment equipment 112 may include a control chip or a control circuit for receiving a control command from the home control gateway 20, and executing the corresponding functional operations according to the control command.

The home control gateway 20 has a plurality of registers, where each of the registers is corresponding to a home control function of one home equipment. Further, the home control gateway 20 provides an operating interface for controlling the registers. For example, this operating interface performs a remote control through a web control interface (i.e., web browser) or a mobile application (APP). In addition, the home control gateway 20 has one or more communication channels, and a user may perform the remote control through communications with the home control gateway 20 via the communication channel(s).

The local area network 30 is a wireless communication network (Wi-Fi) established according to LAN protocol transmission standard, and the home control gateway 20 may communicate with other electronic devices with network conductivity through the local area network 30. For example, this LAN protocol transmission standard is 802.11 series constituted by Institute of Electrical and Electronics Engineers (IEEE) according to the Internet protocol transmission standard. However, the invention is not limited thereto. For example, the local area network 30 may be a wired local area network.

The mobile communication device 40 is a mobile communication equipment of the user, which includes Subscriber Identity Module Card (SIM Card). The mobile communication device 40 is, for example, a cell phone, a personal digital assistant (PDA) phone, a smart phone, and so on. However, the invention is not intended to limit types of the mobile communication device 40.

The mobile phone network 50 is a telecommunication service provided by a telecommunication service provider, such as Global System For Mobile Communications (GSM), Code Division Multiple Access (CDMA), Personal Handy-phone System, (PHS) and so on.

In the present exemplary embodiment, the mobile communication device 40 is capable of communicating with the home control gateway 20 through an incoming called-signal of the mobile phone network 50 or by ways of Short Message Service (SMS) or voice message. In addition, the home control gateway 20 may also receive a connection request from the mobile communication device 40 via the local area network 30. When the connection request of the mobile communication device 40 is granted, through use of the operating interface provided by the home control gateway 20, the user may perform the remote control to the power equipment 102, the lighting equipment 104, the security equipment 106, the air condition equipment 108, the appliance equipment 110 and the entertainment equipment 112 by using the mobile communication device 40.

Figure 2:
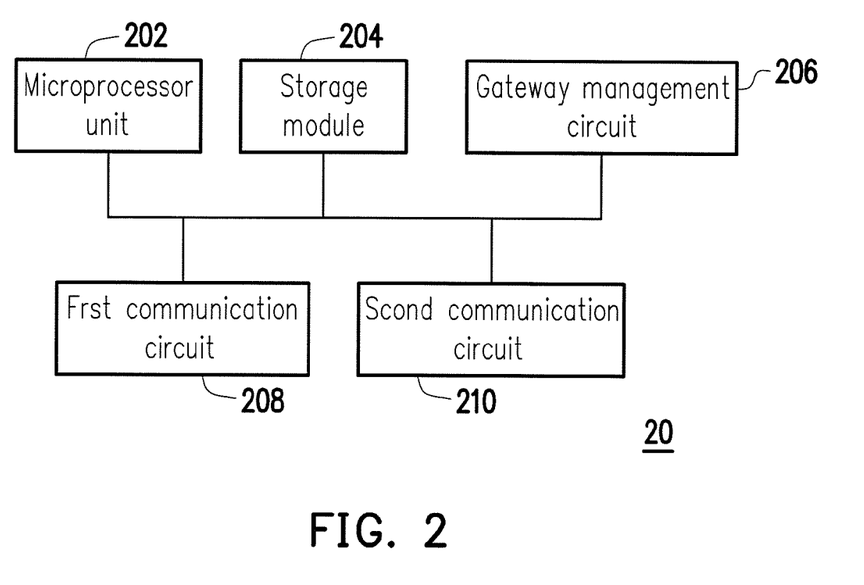
FIG. 2 is a block diagram illustrating a home control gateway according to an exemplary embodiment.

FIG. 2 is a block diagram illustrating a home control gateway according to an exemplary embodiment.

Referring to FIG. 2, the home control gateway 20 includes a microprocessor unit 202, a storage module 204, a gateway management module 206, a first communication circuit 208 and a second communication circuit 210.

The microprocessor unit 202 may be a hardware with computing capabilities (e.g., a chip set, a processor, etc.) which is configured to control overall operation of the home control gateway 20. In the present exemplary embodiment, the microprocessor unit 202 is, for example, a central processing unit (CPU) or other programmable microprocessors, a digital signal processor (DSP), a programmable controller, an application specific integrated circuits (ASIC), a programmable logic device (PLD) or other similar devices.

The storage module 204 is coupled to the microprocessor unit 202. The storage module 204 may be an embedded storage unit or an external storage unit. The embedded storage unit may be a random access memory (RAM), a read-only memory (ROM), a flash memory, a magnetic disk storage device, and so on. The external storage unit may be Compact Flash (CF) memory card, Secure Digital (SD) memory card, Micro SD memory card, Memory Stick (MS) memory card, and so on. Specifically, in the present exemplary embodiment, the storage module 204 is configured to store a phone number of the mobile communication device and store one or more programs or applications, operating systems for controlling operation of the home control gateway 20. For example, an amount of the mobile communication device numbers may be less than a predefined value. Herein, this predefined value may be set based on the capacity of the storage module 204.

In addition, before the user can perform operations for the remote home control through the home control gateway 20, the mobile communication device numbers must be pre-stored into the storage module 204 of the home control gateway 20. In the present embodiment, the user is able to pre-store one or more mobile communication device numbers.

For example, the user may store his/her mobile communication device number into the storage module 204 by a machine learning method through the home control gateway 20. Alternatively, in another exemplary embodiment, the user may also store his/her mobile communication device number into the storage module 204 by a manual input method.

In the example where the phone number is stored by the machine learning method through the home control gateway 20, the user may first press a learning button disposed on the home control gateway 20, so as to activate an automatic learning function of the home control gateway 20. Thereafter, the user may make a phone call to the home control gateway 20. In this case, the home control gateway 20 may identify the phone number of such phone call according to the incoming called-signal and store the incoming called-signal into the storage module 204 of the home control gateway 20 without answering to the phone call.

In the example where the phone number is stored into the storage module 204 of the home control gateway 20 by the manual input method, the operating interface of the home control gateway 20 may include an input screen for the mobile communication device number, so that the user is able to key in the mobile communication device number through an electronic device having a physical keyboard or a virtual keyboard. As another example, the user is also able to input the phone number to be pre-stored as a short message through the mobile communication device and transmit the short message to the home control gateway 20 for storage. As yet another example, through a voice operating service provided by the home control gateway 20, the user is also able to input the phone number into the home control gateway 20 for storage by using a phone keypad.

The gateway management module 206 is coupled to the microprocessor unit 202 and records a plurality of registers. For example, the registers are stored in the storage module 204. Herein, each of the registers may be set as a first value representing 'ON' or a second value representing 'OFF'. For example, the first value is '1' and the second value is '0'. It should be mentioned that the present invention is not limited thereto. For example, the first value may be '0' and the second value may be '1'.

In the present exemplary embodiment, one of the registers (also known as a first register) is used as a flag, which is configured to instruct a current control state of the home control gateway 20 to be an opening mode, a closed mode or other modes. For example, when the control state of the home control gateway 20 is the opening mode, it indicates that the home control gateway 20 is granted to perform the remote control to the home equipments. For example, when the control state of the home control gateway 20 is the closed mode, it indicates that the home control gateway 20 is not granted to perform the remote control to the home equipments. Herein, aspects included by the control state are not particularly limited in the invention. A preset control state of the first register is the closed mode. Further, the rest of the registers (also known as a second register) are corresponding to the home control functions of the home equipments, respectively. For example, the gateway management module 206 may record one register for corresponding to on/off states of the lighting equipment 104. For example, the gateway management module 206 may record one register configured for corresponding to on/off states of the air condition equipment 108. For example, the gateway management module 206 may record one register configured for corresponding to a temperature regulation function of the air condition equipment 108. For example, the gateway management module 206 may record one register configured for corresponding to on/off states of the entertainment equipment 112. Herein, the present invention is not intended to limit an amount of the registers recorded by the gateway management module 206 nor actions of the home control function to which the registers correspond. For example, the functions of the gateway management module 206 may also be implemented in a manner of program codes stored in the storage module 204. Further, when the home control gateway 20 is powered on, the microprocessor unit 202 may run the program codes in order to execute the functions of the gateway management module 206.

In addition, the gateway management module 206 also provides the operating interface, so that the user may set the second register through the operating interface to operate the corresponding home control function. The home control gateway 20 also provides a uniform resource locator (URL) (i.e., a web address) for accessing the operating interface. Particularly, the home control gateway 20 grants the electronic device of the user to access the operating interface simply by using the uniform resource locator without using a login mechanism with an account name and a password. That is to say, it is not required for the operating interface provided by the home control gateway 20 to include a user login screen. Accordingly, the inconvenience for memorizing the account name and the password as well as the trouble for resetting the home control gateway 20 caused by forgetting the account name and the password may both be prevented. For example, the uniform resource locator may be a class C network uniform resource locator. Herein, the class C network herein refers to an IP (Internet Protocol) address of the home control gateway 20 assigned by the corresponding local area network 30. For instance, the address of this class C network is "192.168.1.1." However, is should be noted that the present invention is not limited thereto and other network protocol may be applied in the present invention. Additionally, in the present exemplary embodiment, the operating interface is implemented in form of a web page, and the mobile communication device 40 uses a web browser to open a service page through a Wi-Fi connection or a wired network with the web address provided by the home control gateway 20. In another embodiment of the invention, the operating interface may also be in form of the application (APP). Nevertheless, it should be understood that the invention is not limited thereto.

The first communication circuit 208 is coupled to the microprocessor unit 202 and operates by using a transmission standard or a protocol compatible with the mobile phone network 50. For example, the first communication circuit 208 is capable of transmitting and receiving a voice signal or the short message via the mobile phone network 50.

The second communication circuit 210 is coupled to the microprocessor unit 202 and operates by using a transmission standard or a protocol compatible with the local area network 30 in order to transfer or receive packets through the local area network 30.

FIGS. 3A to 3D are flowcharts illustrating a gateway control method according to an exemplary embodiment.

Figure 3A:
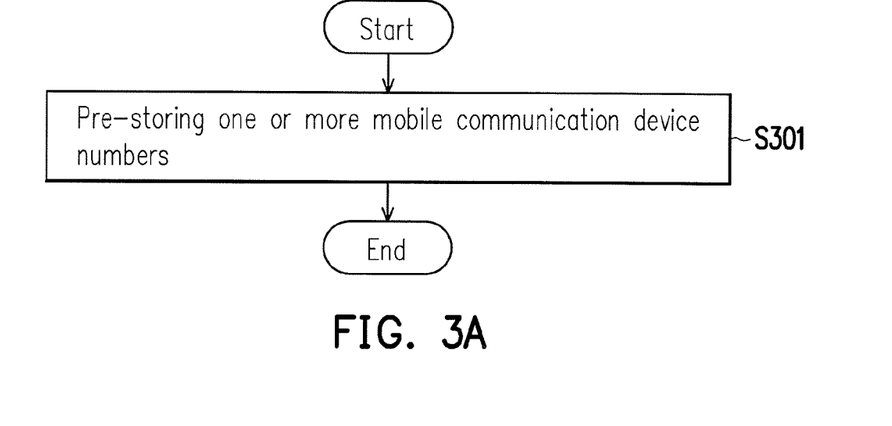
FIGS. 3A to 3D are flowcharts illustrating a gateway control method according to an exemplary embodiment.

Referring to FIG. 3A, in step S301, the user pre-stores one or more mobile communication device numbers into the storage module 204 by a manual input method or a machine learning method.

Figure 3B:
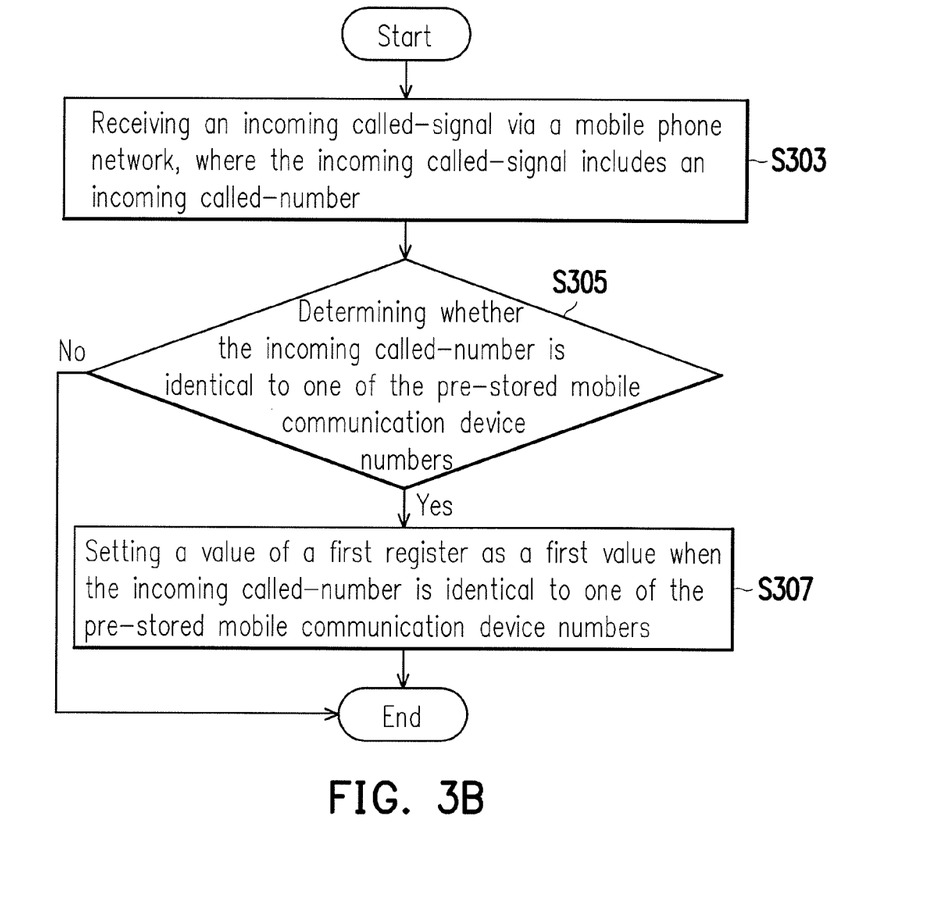

Referring to FIG. 3B, in step S303, the first communication circuit 208 receives an incoming called-signal including an incoming called-number via the mobile phone network 50. The first communication circuit 208 also identifies the incoming called-number. In particular, the first communication circuit 208 is capable of identifying the incoming called-number without answering to the incoming called-signal.

In step S305, the gateway management module 206 compares the incoming called-number with the mobile communication device numbers pre-stored in the storage module 204, and determines whether the incoming called-number is identical to one of the pre-stored mobile communication device numbers. If the gateway management module 206 determines that the incoming called-number is identical to one of the pre-stored mobile communication device numbers, in step S307, the gateway management module 206 sets the value of the first register as the first value to instruct the current control state of the home control gateway 20 to be the opening mode and ready for accepting the remote control.

If the gateway management module 206 determines that the incoming called-number is not identical to any of the pre-stored mobile communication device numbers, the gateway management module 206 does not set the value of the first register as the first value (i.e., the value of the first switch is kept with the second value).

Figure 3C:
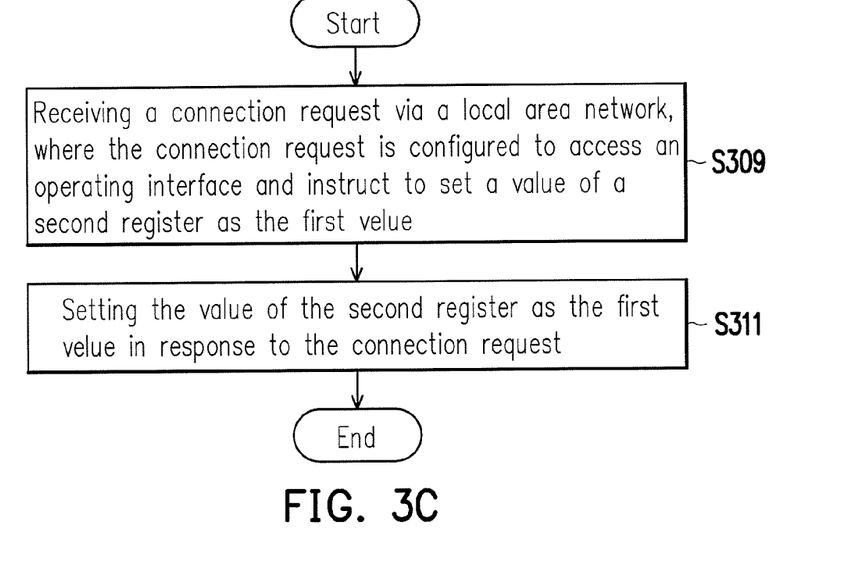

Referring to FIG. 3C, in step S309, the second communication circuit 210 receives a connection request via the local area network 30, wherein the connection request is configured to access an operating interface provided by the gateway management module 206 and instruct to set the value of the second register as the first value through the operating interface. In step S311, the gateway management module 206 sets the value of the second register as the first value in response to the connection request.

Figure 3D:
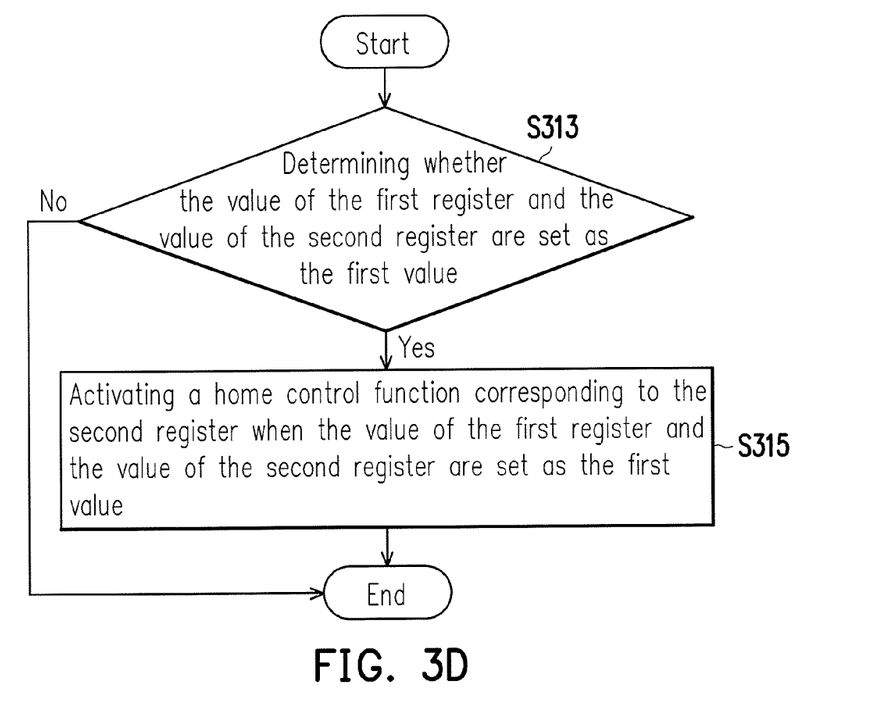

Referring to FIG. 3D, in step S313, the gateway management module 206 determines whether the value of the first register and the value of the second register are both set as the first value. In step S315, the gateway management module 206 activates a home control function corresponding to the second register when the value of the first register and the value of the second register are both set as the first value.

It should be noted that, it is also possible that steps S309 to S311 in FIG. 3C are performed in advance to steps S303 to S307 in FIG. 3B.

Figure 4:
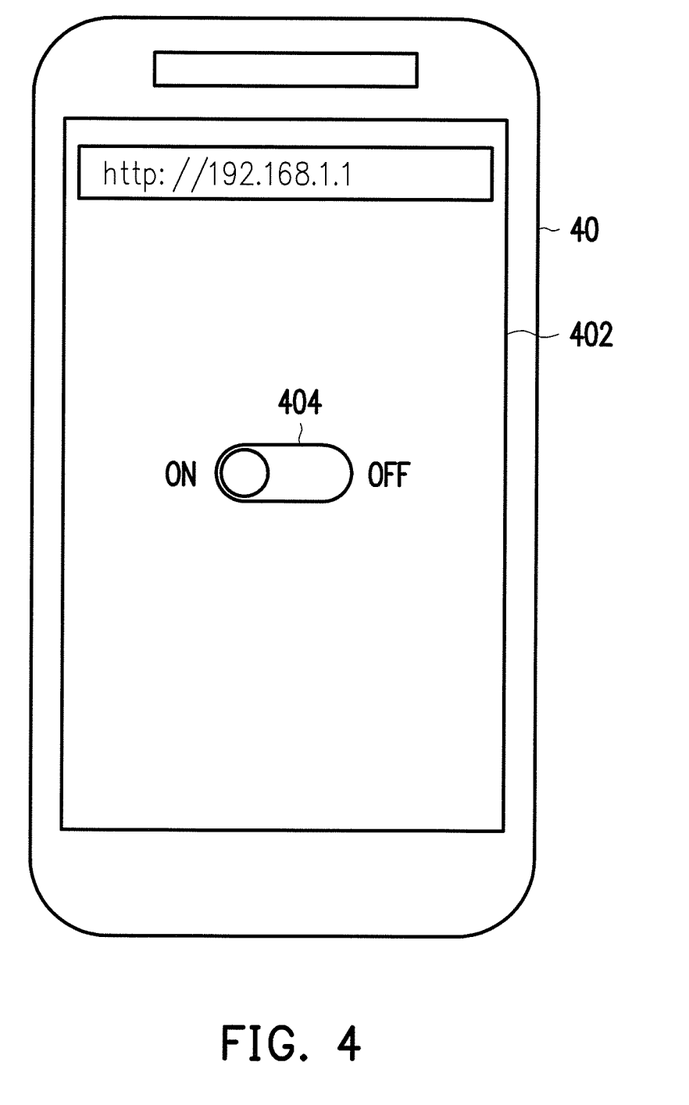
FIG. 4 is a block diagram illustrating the operating interface of the home control gateway according to an exemplary embodiment.

FIG. 4 is a block diagram illustrating the operating interface of the home control gateway according to an exemplary embodiment.

Referring to FIG. 4, herein, it is assumed that the user who arrived at a front door intends to open a door lock through the operating interface of the home control gateway 20 by using the mobile communication device 40. First of all, the user must make a phone call to the home control gateway 20 with the pre-stored phone number. Particularly, the home control gateway 20 does not answer to the phone call but only identifies whether the phone number of such phone call is identical to one of the mobile communication device numbers. When it is confirmed that the phone number of such phone call is identical to one of the pre-stored mobile communication device numbers, the home control gateway 20 set the value of the first register as the first value to instruct the home control gateway 20 to accept the remote control for now. Subsequently, the user may use the mobile communication device 40 to connect to a wireless local area network environment (e.g., class C domain 192.168.1.x) provided by the home control gateway 20 via the local area network 30, and input the uniform resource locator (e.g., "http://192.168.1.1") provided by the home control gateway 20 into an address bar of a web browser of the mobile communication device 40 in order to request the home control gateway 20 for accessing the operating interface. Subsequently, the home control gateway 20 may transmit a control web page screen 402 served as the operating interface in packets to the mobile communication device 40 via the local area network 30 and shows the control web page screen 402 on the browser of the mobile communication device 40. The user may issue an instruction for opening the door lock of the front door through a web page button 404 (i.e., the second register) on the control web page screen 402 (i.e., the operating interface), and such instruction is then transmitted in packets back to the home control gateway 20. Lastly, the home control gateway 20 identifies that the value of the first register and the value of the second register are both set as the first value to thereby open the front door so that the user may enter the house successfully.

It should be noted that, in another exemplary embodiment, the home control gateway 20 may include a timer, which is coupled to the microprocessor unit. When the value of the first register is set as the first value, it indicates that the home control gateway 20 is ready for accepting the remote control while the gateway management module activates the timer simultaneously. Further, a timing value of the timer is compared with a predetermined timing threshold. For example, the predetermined timing threshold may be freely set by the user to be, for example, 3 minutes, 5 minutes, etc. When the timing value of the timer is greater than the predetermined timing threshold, the gateway management module closes the timer and re-sets the value of the first register as the second value. For example, in the case where the timing value is 5 minutes, when the timing value of the timer is greater than 5 minutes, the gateway management module closes the timer and re-sets the value of the first register as '0'.

Specifically, the user needs to make the phone call to the home control gateway 20 with the pre-stored phone number in order to set the value of the first register as the first value, so that the home control gateway 20 may accept the remote control while activating the timer at the same time. Herein, it is assumed that the user set the value of the second register corresponding to the function of the home equipment as the first value in the operating interface within a time defined by the predetermined timing threshold of the timer. In this case, because the values of the first and second registers are both set as the first value, the home control gateway 20 may then execute the home control function corresponding to the second register. Otherwise, if the user sets the value of the second register corresponding to the function of the home equipment as the first value in the operating interface after the time defined by the predetermined timing threshold of the timer is expired, because the value of the first register is re-set as the second value in this case, the user cannot conduct the remote control to the home equipment since there is only the value of the second register being the first value. Accordingly, a security for the remote home control may be improved more preferably.

In another exemplary embodiment of the invention, the gateway management module 206 of the home control gateway 20 initially prohibits the value of the second register from changing. In other words, the value of the second switch is initially set to be at a read-only status. Before the user uses the mobile communication device 40 to connect to the operating interface of the home control gateway 20 via the local area network 30 in order to control the home equipment, the phone call must be made to the home control gateway 20. Then, when determining that the incoming called-number is identical to one of the pre-stored mobile communication device numbers, the gateway management module 206 sets the value of the first register as the first value to instruct the home control gateway 20 to accept the remote control for now while enabling the access of the second register (i.e., the second register is set to be at a rewritable status for being changed). Subsequently, the user may gain access to the operating interface of the home control gateway 20 via the local area network 30 in order to change the value of the second register as the first value. Lastly, when determining that the value of the first register and the value of the second register are both set as the first value, the home control gateway 20 then activates the home control function corresponding to the second register.

Figure 5:
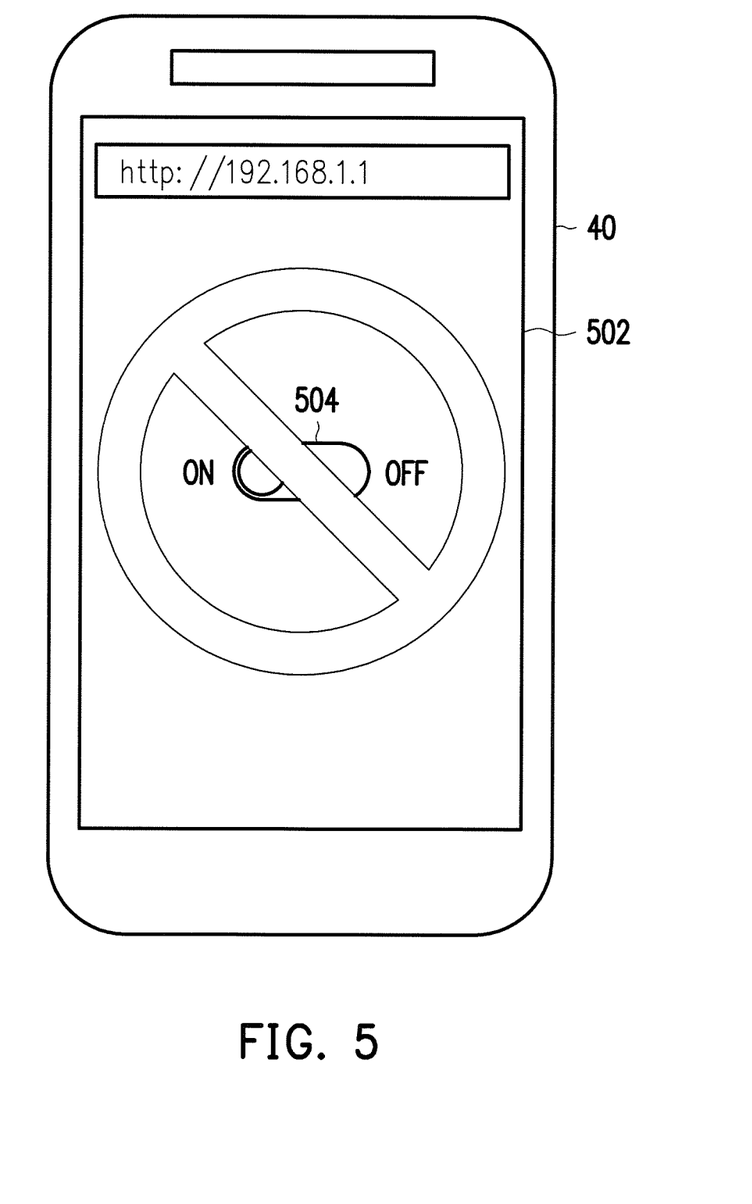
FIG. 5 is a block diagram illustrating the operating interface of the home control gateway according to another exemplary embodiment.

FIG. 5 is a block diagram illustrating the operating interface of the home control gateway according to another exemplary embodiment.

Referring to FIG. 5, it is assumed that the user does not make the phone call to the home control gateway 20 after arriving at the front door but use the mobile communication device 40 to connect to the uniform resource locator (e.g., http://192.168.1.1) provided by the home control gateway 20 via the local area network 30 and request for accessing the operating interface. In this case, a web page button 504 (i.e., the second register) on a control web page screen 502 (i.e., the operating interface) viewed by the user on the web browser of the mobile communication device 40 is instructed to be a disable state (i.e., the second register is set to be at the read-only status). Accordingly, the user is able to gain access to the operating interface (the control web page screen 502) of the home control gateway 20 but unable to control any of the home equipments. As such, the user needs to make the phone call to the home control gateway 20 with the pre-stored phone number. When the gateway management module 206 of the home control gateway 20 determines that the incoming called-number is identical to one of the pre-stored mobile communication device numbers, the value of the first register is set as the first value to instruct the home control gateway 20 to accept the remote control while enabling the updating function of the second register (i.e., the second register is set to be at the rewritable status) to relieve the disable state for the home control function corresponding to the second register. Subsequently, the user is able to gain access to the operating interface (the control web page screen 502) and set the web page button 504 (i.e., the second register) open (i.e., as the first value). Lastly, after the home control gateway 20 determines that the value of the first register and the value of the second register are both set as the first value, the front door may then be opened so that the user may enter the house successfully. Accordingly, the security for the remote home control may be further improved.

In summary, in the home control gateway and the gateway control method according to the embodiments of the invention, the user is able to make the phone call to the home control gateway with the pre-stored phone number to request the home control gateway for accessing the operating interface through the uniform resource locator and activate the registers for the home control functions through the operating interface. After determining that a corresponding register is set as a corresponding value, the home control gateway may conduct the actions corresponding to the control function of the home equipment selected by the user. In addition, the present invention is also capable of counting time after the user makes the phone call to the home control gateway with the pre-stored phone number. When the user fails to control the home equipment in the operating interface within the predetermined timing unit, the user needs to re-make the phone call for requesting control to the home equipment. Furthermore, the present invention is also capable of initially disabling the home control functions. When the user fails to make the phone call to the home control gateway with the pre-stored phone number in advance, even if the user requests the home control gateway for accessing the operating interface and intends to activate the registers for the home control functions through the operating interface, the registers for the home control functions cannot be updated. As a result, the user is able to operate the home equipments through the mobile communication device in convenient, secure, simple and easy manners.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A home control gateway, comprising:
   a microprocessor unit;
   a gateway management module coupled to the microprocessor unit and recording a first register and a second register, wherein the gateway management module provides an operating interface to access the second register;
   a storage module coupled to the microprocessor unit, wherein the storage pre-stores one or more mobile communication device numbers;
   a first communication circuit coupled to the microprocessor unit, wherein the first communication is configured to connect to a mobile phone network; and
   a second communication circuit coupled to the microprocessor unit, wherein the second is configured to connect to a local area network,
   wherein the first communication circuit receives an incoming called-signal via the mobile phone network, and the incoming called-signal comprises an incoming called-number,
   wherein the gateway management module sets a value of the first register as a first value when the incoming called-number is identical to one of the mobile communication device numbers,
   wherein the second communication circuit receives a connection request via the local area network, and the connection request is configured to access the operating interface and instruct to set a value of the second register as the first value,
   wherein the gateway management module sets the value of the second register as the first value in response to the connection request,
   wherein the gateway management module activates a home control function corresponding to the second register when the value of the first register and the value of the second register are both set as the first value.

2. The home control gateway according to claim 1, further comprising:
   a timer coupled to the microprocessor unit,
   wherein the gateway management module activates the timer when the value of the first register is set as the first value,
   wherein the gateway management module closes the timer and re-sets the value of the first register as a second value when a timing value of the timer is greater than a predetermined timing threshold.

3. The home control gateway according to claim 1,
   wherein the gateway management module initially sets the second register to be at a read-only status,
   wherein the gateway management module re-sets the second register to be a rewritable status when the incoming called-number is identical to one of the mobile communication device numbers.

4. The home control gateway according to claim 1, wherein the mobile communication device numbers are pre-stored by a manual input method.

5. The home control gateway according to claim 1, wherein the mobile communication device numbers are pre-stored by a machine learning method.

6. The home control gateway according to claim 1, wherein an amount of the mobile communication device numbers is less than a predefined value.

7. The home control gateway according to claim 1, wherein the operating interface is accessed by a web browser or a mobile application.

8. The home control gateway according to claim 1, wherein the local area network is a wired local area network or a wireless local area network.

9. A gateway control method executed by a home control gateway providing an operating interface, the gateway control method comprising:
   pre-storing one or more mobile communication device numbers by a storage module of the home control gateway;
   receiving an incoming called-signal comprising an incoming called-number via a mobile phone network by a first communication circuit of the home control gateway;
   setting a value of a first register as a first value when the incoming called-number is identical to one of the mobile communication device numbers by a gateway management module of the home control gateway;
   receiving a connection request via a local area network by a second communication circuit of the home control gateway, wherein the connection request being configured to access the operating interface and instruct to set a value of a second register as the first value;
   setting the value of the second register as the first value in response to the connection request by the gateway management module of the home control gateway; and
   activating a home control function corresponding to the second register by the gateway management module of the home control gateway when the value of the first register and the value of the second register are both set as the first value.

10. The gateway control method according to claim 9, further comprising:
    activating a timer when the value of the first switch is set as the first value by the gateway management module of the home control gateway; and
    closing the timer and re-setting the value of the first register as a second value when a timing value of the timer is greater than a predetermined timing threshold by the gateway management module of the home control gateway.

11. The gateway control method according to claim 9, further comprising:
    initially setting the second register to be a read-only status by the gateway management module of the home control gateway; and
    re-setting the second register to be a rewritable status when the incoming called-number is identical to one of the mobile communication device numbers by the gateway management module of the home control gateway.

12. The gateway control method according to claim 9, wherein the step of pre-storing the one or more mobile communication device numbers includes: pre-storing the one or more mobile communication device numbers by a manual input method.

13. The gateway control method according to claim 9, wherein the step of pre-storing the one or more mobile communication device numbers includes: pre-storing the one or more mobile communication device numbers by a machine learning method.

14. The gateway control method according to claim 9, wherein an amount of the mobile communication device numbers is less than a predefined value.

15. The gateway control method according to claim 9, wherein the operating interface is accessed by a web browser or a mobile application.

16. The gateway control method according to claim 9, wherein the local area network is a wired local area network or a wireless local area network.

\* \* \* \* \*